US010033960B2

(12) United States Patent
Chen (10) Patent No.: US 10,033,960 B2
(45) Date of Patent: *Jul. 24, 2018

(54) APPARATUS, SYSTEMS AND METHODS FOR ACCESSING MISSED MEDIA CONTENT

(71) Applicant: EchoStar Technologies L.L.C., Englewood, CO (US)

(72) Inventor: Mi Chen, Aurora, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/606,655

(22) Filed: May 26, 2017

(65) Prior Publication Data

US 2017/0374312 A1 Dec. 28, 2017

Related U.S. Application Data

(63) Continuation of application No. 15/166,752, filed on May 27, 2016, now Pat. No. 9,667,909, which is a
(Continued)

(51) Int. Cl.
| | |
|---|---|
| *H04N 5/78* | (2006.01) |
| *H04N 5/782* | (2006.01) |
| *H04N 7/16* | (2011.01) |
| *H04N 5/445* | (2011.01) |
| *H04N 21/433* | (2011.01) |
| *H04N 21/458* | (2011.01) |
| *H04N 21/658* | (2011.01) |

(Continued)

(52) U.S. Cl.
CPC ......... *H04N 5/782* (2013.01); *H04N 5/44543* (2013.01); *H04N 7/165* (2013.01); *H04N 21/2393* (2013.01); *H04N 21/2665* (2013.01); *H04N 21/26225* (2013.01); *H04N 21/26258* (2013.01); *H04N 21/26283* (2013.01); *H04N 21/4147* (2013.01); *H04N 21/42204* (2013.01); *H04N 21/433* (2013.01); *H04N 21/4583* (2013.01); *H04N 21/47202* (2013.01); *H04N 21/47214* (2013.01); *H04N 21/6581* (2013.01)

(58) Field of Classification Search
None
See application file for complete search history.

(56) References Cited

U.S. PATENT DOCUMENTS

| | | | |
|---|---|---|---|
| 9,667,909 B2 * | 5/2017 | Chen | H04N 5/782 |
| 2004/0019909 A1 * | 1/2004 | Takahashi | G11B 15/02 |
| | | | 725/58 |

(Continued)

*Primary Examiner* — Eileen M Adams
(74) *Attorney, Agent, or Firm* — Lowe Graham Jones PLLC (57) ABSTRACT

Systems and methods are operable to retrieve at least a portion of a missed media content event. An exemplary embodiment detects an occurrence of a failed recording of at least a portion of a media content event of interest; transmits a notification of the detected occurrence of the failed recording of the at least the portion of the media content event of interest from a media device to a replacement content device; and receives, at the media device, at least a portion of missed media content corresponding to at least the portion of the media content event of interest that failed to record.

20 Claims, 5 Drawing Sheets

Related U.S. Application Data continuation of application No. 13/046,621, filed on Mar. 11, 2011, now Pat. No. 9,357,154.

(51) Int. Cl.
*H04N 21/262* (2011.01)
*H04N 21/239* (2011.01)
*H04N 21/472* (2011.01)
*H04N 21/422* (2011.01)
*H04N 21/4147* (2011.01)
*H04N 21/2665* (2011.01)

(56) References Cited

U.S. PATENT DOCUMENTS

| | | | |
|---|---|---|---|
| 2008/0240673 A1* | 10/2008 | Ugawa | G11B 27/10 386/326 |
| 2008/0259391 A1* | 10/2008 | Maruo | G06F 3/121 358/1.15 |
| 2009/0067816 A1* | 3/2009 | Tung-Liang | H04N 7/17318 386/239 |
| 2009/0144784 A1* | 6/2009 | Li | H04N 7/17318 725/97 |
| 2009/0300673 A1* | 12/2009 | Bachet | H04N 7/17318 725/31 |
| 2011/0088052 A1 | 4/2011 | Ramaswamy et al. | |
| 2012/0270576 A1* | 10/2012 | Herrington | H04L 65/4076 455/466 |

* cited by examiner

APPARATUS, SYSTEMS AND METHODS FOR ACCESSING MISSED MEDIA CONTENT

PRIORITY CLAIM

This patent application is a Continuation of U.S. Non-Provisional patent application Ser. No. 15/166,752, filed May 27, 2016, entitled "APPARATUS, SYSTEMS AND METHODS FOR ACCESSING MISSED MEDIA CONTENT," and issued as U.S. Pat. No. 9,667,909 on May 30, 2017, which is a Continuation of U.S. Non-Provisional patent application Ser. No. 13/046,621, filed Mar. 11, 2011, entitled "APPARATUS, SYSTEMS AND METHODS FOR ACCESSING MISSED MEDIA CONTENT," issued as U.S. Pat. No. 9,357,154 on May 31, 2016, both of which are incorporated herein by reference in their entirety.

BACKGROUND

Media devices, such as a set top box, are configured to receive media content events from a broadcasting system. Non-limiting examples of media content events include movies, news programs, sporting events, serial comedies or dramas, and other program events that are communicated to the media device by a program service provider over the broadcasting system. Non-limiting examples of broadcasting systems include satellite systems, cable or other wire-based systems, or over the air (OTA) broadcasting systems.

The media content events are communicated to the media device in the form of content streams. The media content event may then be provided to a viewer in a continuous, streaming manner and/or the media content events may be stored by a user in a digital video recorder ("DVR").

However, under various conditions, a service interruption may occur. A service interruption is a loss of signal resulting in a failed delivery or processing of the media content stream. For example, receipt of the media content stream may be interrupted or interfered with, such as when precipitation interrupts and/or interferes with the media content stream being broadcast from the transmit facility to the satellite, and/or from the satellite to the antenna at the user's location. Generally when there is such an interruption, many media devices are affected. As another example, a service interruption may result when a plurality of components of a broadcast system and/or a media device experience a partial or complete failure, thus interrupting delivery and/or processing of the media content stream. As yet another example, an internal error or recording conflict may occur in the media device, resulting in the failure of the media device to record selected media content.

Prior art systems may employ data redundancy schemes to improve the reliability of media content delivery. However, no level of redundancy will remedy a complete loss of the media content stream signal or a failure to record at the media device. Accordingly, there is a need to provide media content in situations where the viewer wishes to access previously presented media content that was lost due to service interruptions.

SUMMARY

Systems and methods are operable to retrieve at least a portion of a missed media content event. An exemplary embodiment detects an occurrence of a failed recording of at least a portion of a media content event of interest; transmits a notification of the detected occurrence of the failed recording of the at least the portion of the media content event of interest from a media device to a replacement content device; and receives, at the media device, at least a portion of missed media content corresponding to at least the portion of the media content event of interest that failed to record.

BRIEF DESCRIPTION OF THE DRAWINGS

Preferred and alternative embodiments are described in detail below with reference to the following drawings.

DETAILED DESCRIPTION

Figure 1:
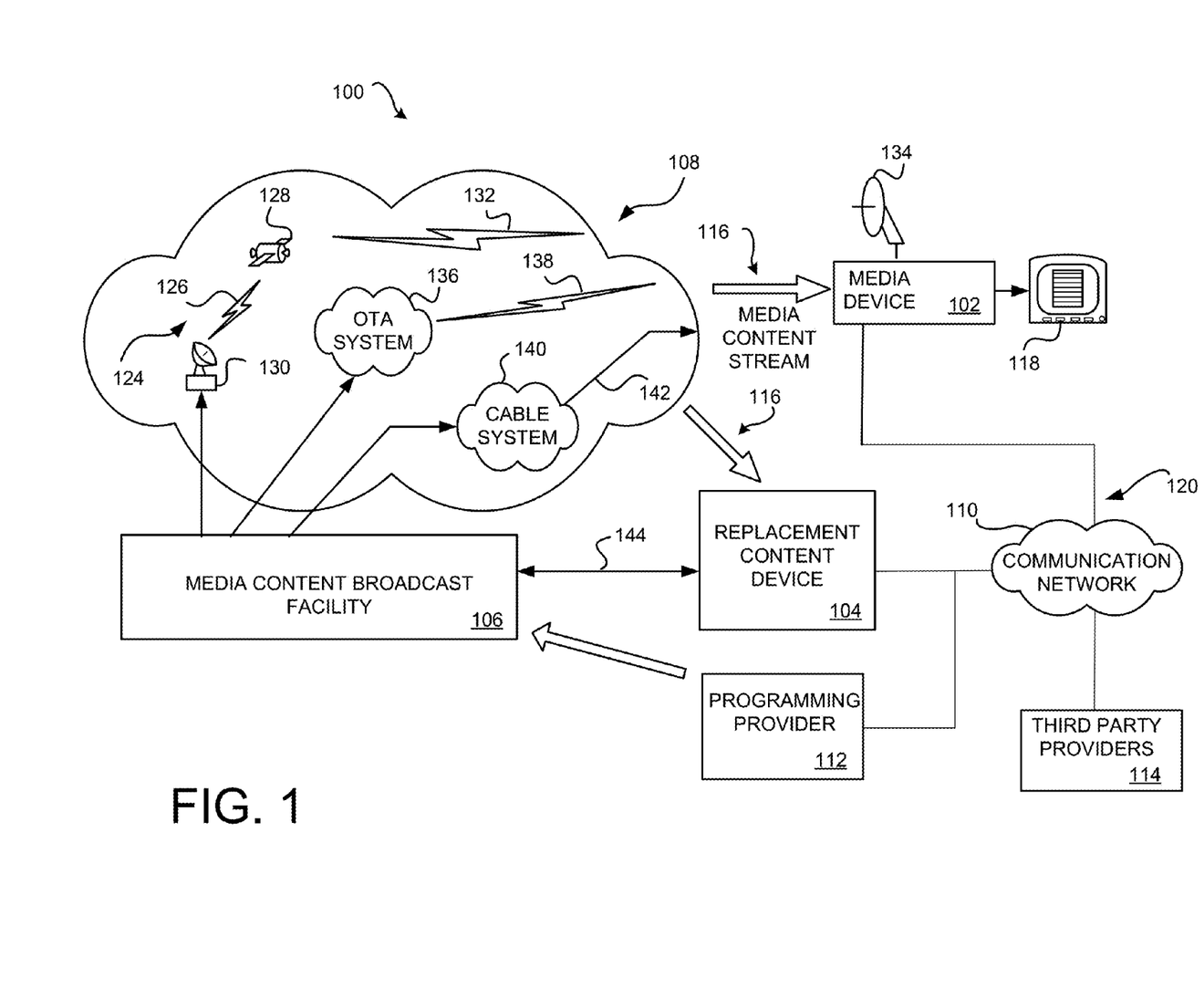
FIG. 1 is a block diagram of an embodiment of a replacement content retrieval system.

FIG. 1 is a block diagram of an embodiment of a replacement content retrieval system 100. The exemplary embodiment of the replacement content retrieval system 100 is implemented in an exemplary environment that comprises a plurality of media devices 102, at least one replacement content device 104, a media content broadcast facility 106, a broadcast system 108, a communication network 110, programming providers 112, and third party providers 114. The media device 102 receives a media content stream 116 provided from the media content broadcast facility 106 over the broadcast system 108. The media content stream 116 is provided by a media content service provider.

An exemplary media device 102 includes, but is not limited to, a set top box (STB) that is communicatively coupled to the broadcast system 108. Other embodiments of the media device 102 include a television (TV), a digital video disc (DVD) player, a DVD recorder, a game playing device, a mobile device, or a personal computer (PC). The media device 102 is configured to store selected media content events that are received in the media content stream 116.

The media content stream 116 comprises a plurality of streamed media content events. Some media content broadcast facilities 106 simultaneously broadcast many media content events, even hundreds of broadcast media content events, in the media content stream 116. The media device 102, when in operation, is configured by a user to select one of the plurality of simultaneously broadcast media content events for presentation on a media presentation device 118. Exemplary media presentation devices 118 include, but are not limited to, TV's, stereos, radios, surround sound systems, personal computers or the like that may be communicatively coupled to the media device 102 that is receiving the media content stream 116. In some embodiments, the media device 102 and the media presentation device 118 may be an integrated single electronic device.

An exemplary broadcast system 108 comprises a satellite broadcast system 124. A plurality of the media content streams 116 reside in a transport channel 126 that is uplinked to a plurality of satellites 128, via a corresponding transmit antenna 130. The respective transport channels are then communicated, in the form of a wireless signal 132, from a plurality of the satellites 128 down to a receiver antenna 134 that is communicatively coupled to the media device 102. The received wireless signal 132 (with the media content stream 116) is then communicated from the receiver antenna 134 to the media device 102. The receiver antenna 134 and the media device 102 may be configured to receive multiple wireless signals 132 from a plurality of satellites 128. The replacement content device 104 may optionally receive the media content stream 116 with a receiver antenna (not shown) over the wireless system 132.

Alternatively, or additionally, the plurality of media content events may be broadcast to the media device 102 via an over the air (OTA) system 136. For example, the media content broadcast facility 106 may be a local program provider that broadcasts media content events to the media device 102 using a wireless signal 138. The received wireless signal 138 with the media content stream 116 is received at the receiver antenna 134, or may be received directly by a receiver (not shown) residing in the media device 102. The replacement content device 104 may optionally receive the media content stream 116 over the OTA system 136.

Alternatively, or additionally, the plurality of media content events may broadcast to the media device 102 via a cable system 140. For example, the media content broadcast facility 106 may employ a coaxial cable and/or fiber optic cable 142 that is coupled to the media device 102. The media content stream 116 is received directly by the media device 102. The replacement content device 104 may optionally receive the media content stream 116 over the cable system 140.

Alternatively, or additionally, the media content broadcast facility 106 may use an internet protocol television system (not shown) to deliver a plurality of media content events to the media device 102 via the OTA system 136, the cable system 140 and/or a wired connection such as connection 144. The replacement content device 104 may optionally receive the media content events using the interne protocol television system.

A media device 102 is generally configured to store a selected media content event for later viewing. In some situations, the media device 102 may fail to store at least a portion of the selected media content event. For example, the failure to store at least a portion of the selected media content event may be a result of a service interruption such as wireless signal 132 reception that is degraded or interrupted during a rain storm with heavy precipitation. The interruption can be intermittent, or continuous, until the precipitation level decreases below the interference threshold of the satellite signal.

In another example, the media device 102 may be configured by a user to store multiple selected media content events in overlapping time slots. The multiple media content events may force the media device 102 to select a subset of the selected media content events to be stored, thus causing a failure to record all of the selected media content events.

When the media device 102 detects such failures to store at least a portion of the user requested media content events, the media device 102 requests a selected portion of the missed media content through the replacement content device 104. In response to receiving a request for missed media content from a plurality of media devices 102. Embodiments of the replacement content device 104 are configured to provide instructions to the media device 102 to access the missed media content. In some cases the replacement device 104 is configured to transfer the media content to the media device 102.

In an exemplary embodiment, the replacement content device 104 is configured to identify a plurality of content sources and/or content providers for the media content event. The replacement device 104 is configured to generate a request for media content corresponding to a missed media content event. The request for media content corresponding to a missed media content event is communicated to the plurality of content sources and/or content providers using communications link 120. In response to the communicated request for the media content, the replacement content device 104 is preferably provided with a notification that identifies the content source and/or content provider that has media content corresponding to the missed media content event.

The missed media content event may be made available for transfer to the media device 102 by a plurality of content sources and/or content providers such as the media content broadcast facility 106. The missed media content event may be scheduled to be rebroadcast over the broadcast system 108. The missed media content event may be available from a third party provider 114 and/or a programming provider 112. A programming provider 112 includes, but is not limited to: local broadcast companies, national broadcast networks, studios, producers and/or other providers of broadcast media. Third party providers 114 include, but are not limited to: Proprietary media providers, IPTV, Video on Demand, Video on Demand Systems, Network Websites and/or the like.

The media content broadcast facility 106 may provide missed media content events to a media device 102 using the broadcast system 108 to rebroadcast the media content event. The media content broadcast facility 106 may also provide the missed media content event to the media device 102 using video on demand services over the broadcast system 108. The missed media content event may be transferred via the communication link 120 and/or by streaming/transferring the missed media content to the media device 102 using the replacement content device 104 over the communication link 120.

Accordingly, the media device 102 receives the missed media content event from the replacement content device 104 and/or receives location information which the media device 102 may use to identify sources from which to retrieve/view the missed media event. The received location information may include an internet protocol address, a web address, a server location and/or the like.

The replacement content device 104 is further configured to determine a number of similar missed media content events from a plurality of other media devices 102. In an exemplary embodiment, the replacement content device 104, based on the number of similar missed media content events, determines a suitable method for providing the missed content events to a plurality of media devices 102. For example, in the case of the rain storm mentioned above, where a large quantity of users in a geographic area missed a media content event, the replacement content device 104 may request the media content broadcast facility 106 to rebroadcast the media content event.

In an exemplary embodiment, the media device 102 establishes a communication link 120 over the communication network 110, to the replacement content device 104, a programming provider 112, and/or to the third party providers 114. Once the communication link 120 is established between the media device 102 and the replacement content device 104, the media device 102 requests accesses to and/or transfer of the missed media content event. The replacement content device 104, a programming provider 112, and/or the third party providers 114, may then transfer at least a portion of the media content event to the media device 102. The replacement content device 104 may also request the media content broadcast facility 106 to rebroadcast the media content event over the broadcast system 108.

The replacement content device 104 may be located separate from the media device 102 and the media content broadcast facility 106 as is shown in FIG. 1. However in some embodiments, the replacement content device 104 may be part of the media content broadcast facility 106 and/or the media device 102.

In the various embodiments, the replacement content device 104 may also receive the media content stream 116 over the broadcast system 108. The replacement content device 104 is configured to receive and store media content events as they are being communicated to the media device 102, via the media content stream 116.

Alternatively, or additionally, the replacement content device 104 may receive the media content events directly from the media content broadcast facility 106 over a communication link 120. The communication link 120 may be a dedicated communication link, such as an Ethernet communication link, a fiber optic communication link, a wireless link, a cable link, or the like. In some embodiments, the communications link 120 may be established through the communication network 110, or may be established through a portion of the communication network 110. In embodiments that directly receive media content events, the media content events may be communicated to the replacement content device 104 at any time.

The replacement content device 104 is configured to manage the distribution of missed media content events to a plurality of requesting media devices 102. Accordingly, the replacement content device 104 performs a variety of functions. The replacement content device 104 is configured to track requests for missed media content from media devices 102. In an exemplary embodiment, the replacement content device 104 is configured to track which of the missed media content events are available from third party providers 114, programming providers 112, and/or the media content broadcast facility 106. The replacement content device 104 is then able to provide an indication to a requesting media device 102 that identifies a plurality of the third party providers 114, programming providers 112, and/or the media content broadcast facility 106 that may provide the requested media content event.

The indication provided to the requesting media device 102 may include communication link information that is used by the requesting media device 102 to establish the communication link 120 with a particular one of the third party providers 114, programming providers 112, and/or the media content broadcast facility 106 that has the requested media content event.

Some embodiments of the replacement content device 104 are configured to establish the communication link 120 to the media content broadcast facility 108, or another facility, so that ancillary services and/or functionality may be provided. For example, users may be charged a fee, and/or may pay for the service on a monthly basis or the like, for receiving missed media content. The replacement content device 104 may communicate usage information and/or other information back to a billing center so that the services may be tracked and/or managed.

In practice, a user operates their media device 102 to request a future media content event received media content stream 116 be stored by the media device 102. In the event that the request to store at least a portion of a media content event fails, the media device 102 will not have access to the requested media content event. In an exemplary embodiment, the user operates their media device to open the communication link 120 and establish communication with the replacement content device 104 to preferably retrieve the requested media content event. Alternatively, or additionally, embodiments may be configured to automatically establish the communication link 120 with the replacement content device 104.

The media device 102 indicates to the replacement content device 104 the identity of the media content event of interest and requests receipt of the missed media content event. The identity of the media content event may be based upon any suitable identifier of the media content event, such as its title, its program identifier, its channel, its starting time, or the like.

Figure 2:
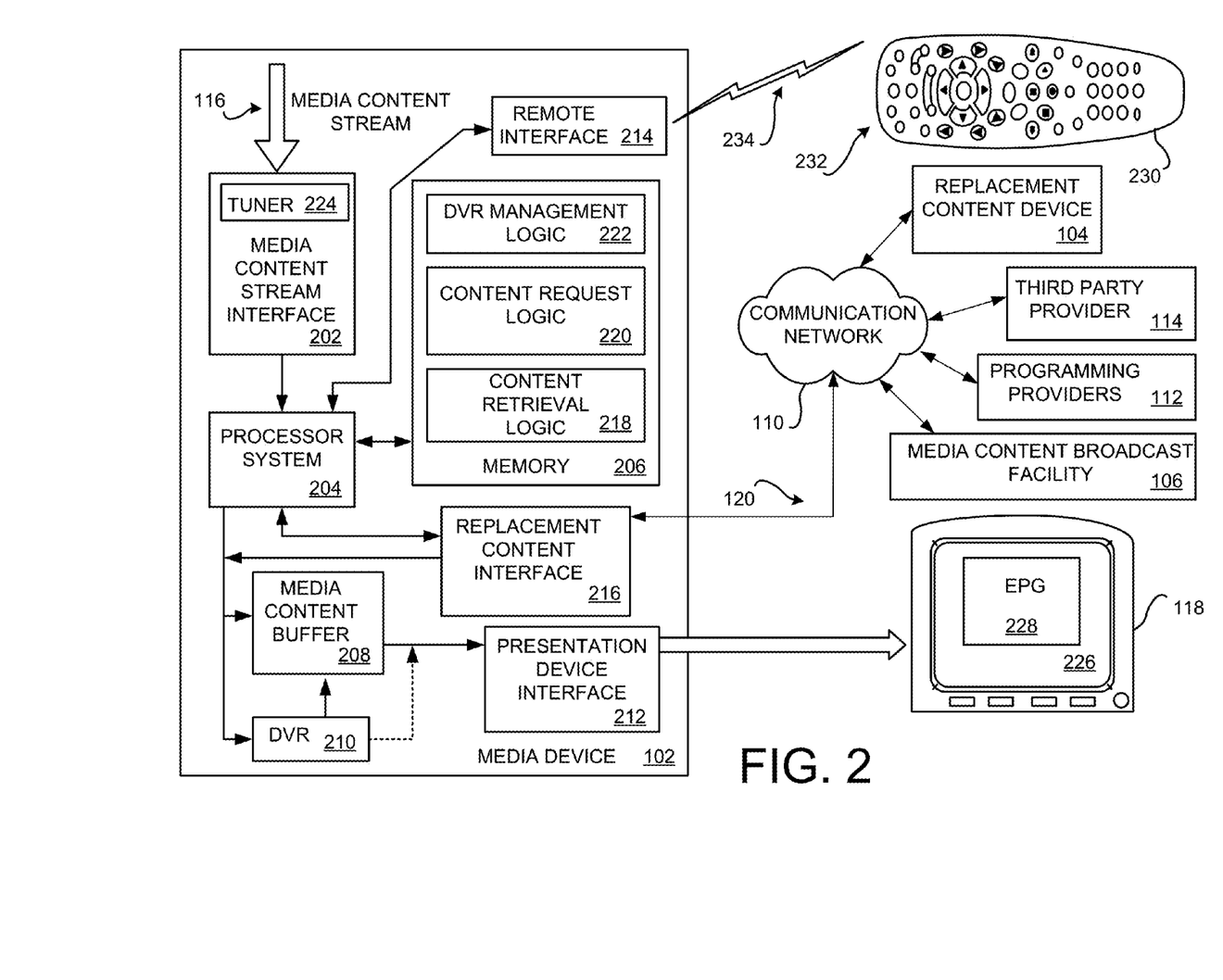
FIG. 2 is a block diagram of an exemplary embodiment of a replacement content device.

FIG. 2 is a block diagram of an exemplary media device 102 that is configured to request and receive the missed media content event. The non-limiting exemplary media device 102 comprises a media content stream interface 202, a processor system 204, a memory 206, a media content buffer 208, a digital video recorder (DVR) 210, a presentation device interface 212, a remote interface 214, and a replacement content interface 216. The memory 206 comprises portions for storing content retrieval logic 218, content request logic 220, and DVR management logic 222. In some embodiments, the content event retrieval logic 218 and the content request logic 220 may be integrated together, and/or may be integrated with other logic. Other media devices 102 may include some, or may omit some, of the above-described media processing components. For example, the media device 102 may comprise and/or be coupled to any suitable recorder that stores media content on a memory medium, such as the exemplary DVR 210. Further, additional components not described herein may be included in alternative embodiments of the media device 102.

The functionality of the media device 102, a set top box, is now broadly described. A plurality of media content streams 116 are delivered via the broadcast system 108 that is operated by the media content provider. The plurality of media content streams 116 are received by the media content stream interface 202. A plurality of tuners 224 in the media content stream interface 202 selectively tune to one of the media content streams 116 in accordance with instructions received from the processor system 204. The processor system 204, based upon a request to store selected media content events of interest specified by a user, operates the media content stream interface 202 to receive a selected media content event, and parses out media content associated with a selected media content event of interest. The media content event of interest is then assembled into a stream of video and/or audio information which may be stored by the media content buffer 208 such that the media content event can be streamed out to the media presentation device 118 via the presentation device interface 212. Alternatively, or additionally, the processor system 204 may operate the recorder so that the parsed out media content is saved into the DVR 210 for later presentation. The DVR 210 may be directly provided in, locally connected to, or remotely connected to, the media device 102.

The media content buffer 208 is configured to store a predefined duration of the media content event of interest.

An exemplary media content buffer 208 may store as much as two hours of media content in its memory medium (not shown). In some embodiments, the media content buffer 208 is incorporated into, or is a virtual portion of the DVR 210.

In this simplified embodiment, the presentation device interface 212 is illustrated as coupled to a media presentation device 118 that includes a display 226, such as a television (hereafter, generically a TV). The video portion of the streamed media content event of interest is displayed on the display 226. The audio portion of the streamed media content event of interest is reproduced as sounds by speakers (not shown).

The exemplary media device 102 is configured to receive commands from a user via a remote control 230. The remote control 230 includes a plurality of controllers 232. The user, by actuating a plurality of the controllers 232, causes the remote control 230 to generate and transmit commands, via a wireless signal 234, to the media device 102. The commands control the media device 102 and/or control the media presentation device 118. The wireless signal 234 may be an infrared signal or an RF signal. Accordingly, the remote interface 214 is configured to receive the wireless signal 234 emitted by the exemplary remote control 230. The remote control 230, in an exemplary embodiment, may be used by the user to navigate about the EPG 228 to select a particular media content event of interest for future recording.

An exemplary embodiment of the remote control 230 includes one or more controllers 232 that are configured to initiate the process of retrieving the missed media content event. Additionally, or alternatively, the controllers 232 may be configured to pre-set the media device 102 to automatically initiate the process of retrieving the media content event of interest. Further, a selection may be made to initiate the process of retrieving the initial portion by operating the controllers 232 to navigate about the DVR 210 settings in the presented EPG 228.

The processor system 204, executing the DVR management logic 222, is configured to detect an occurrence of a failed recording of at least a portion of a media content event of interest. In an exemplary embodiment, when a previously requested media content event recording request has failed, the DVR management logic 222 may automatically request the missed media content from the replacement content device 104. A user is also permitted to request the missed media content from the replacement content device 104.

Embodiments of the replacement content interface 216 are configured to communicatively couple the media device 102 with the replacement content device 104, the third party providers 114, the media content broadcast facility 106, and/or the programming providers 112, via the communication network 110. The replacement content interface 216 may be any suitable communication device, component, or system operable to communicate over the communication network 110.

The communication network 110 is illustrated as a generic communication system. In one embodiment, the communication network 110 comprises the Internet. Accordingly, the replacement content interface 216 is a modem or other type of Internet communication device. Alternatively, the communication network 110 may be a telephony system, a radio frequency (RF) wireless system, a microwave communication system, a fiber optics system, an intranet system, a local access network (LAN) system, an Ethernet system, a cable system, a cellular system, or a hybrid system comprised of multiple types of communication media. In such embodiments, the replacement content interface 216 is configured to establish the communication link 120 with the communication network 110 on an as-needed basis, and is configured to communicate over the particular type of communication network 110 that it is coupled to. In some embodiments, portions of the communication network 110 may employ portions of the broadcast system 108.

The content request logic 220 comprises a data storage repository for information that is used by the media device 102 to generate a request for the missed media content event from the replacement content device 104, the media content broadcast system 106, the third party provider 114, and/or the programming provider 112. For example, a web site address or other identifier of a third party provider 114 may be saved in the content request logic 220 to facilitate establishment of the communication link 120 between the media device 102 and the third party providers 114.

User preferences may be stored in the content request logic 220 and/or elsewhere. For example, but not limited to, the user may configure the media device 102 to automatically initiate retrieval of the missed media content event when at least a portion of the media content event fails to record in the DVR 210. Such user preferences may be specified by the user on a GUI interface or the like that is presented on the media presentation device 118.

The content event retrieval logic 218 provides the logic, when executed by the processor system 204, to manage retrieval of the missed media content event. The content retrieval logic 218 preferably transmits a notification of an occurrence of a failed recording of a media content event to the replacement content device 104. The content retrieval logic 218, when executed on the processor system 204, may generate instructions that enable the replacement content interface 216 to initiate the request based upon the identity of the media content event.

The content event retrieval logic 218 may manage the establishment of the communication link 120 between the media device 102 and the replacement content device 104. In some embodiments, multiple replacement content devices 104 may be available. A plurality of replacement content devices 104 may be used to accommodate different geographic regions and/or to accommodate different technologies of the communication network 110. Thus, an identity and/or communication link establishment instructions may be retrieved from the content request logic 220 so that the request for the selected media content event is communicated to a preferred replacement content device 104, or to an alternative replacement content device 104 in situations where the preferred replacement content device 104 is not available.

The content retrieval logic 218 may manage the processing of the reply received from the replacement content device 104. For example, upon receiving the reply from the replacement content device 104 that identifies a plurality of the third party providers 114, programming providers 112 and/or the media broadcast facility 106 that may provide the missed media content event, the content retrieval logic 218 may manage the establishment of the communication link 120 between the media device 102 and the third party providers 114, programming providers 112 and/or the media broadcast facility 106. The content retrieval logic 218 may manage the request for the missed media content event. In some embodiments, the content retrieval logic 218 may receive an indication from the media content broadcast facility 106, that the missed media content event will be rebroadcast over the broadcast system 108.

When multiple third party providers 114, programming providers 112 and/or the media broadcast facility 106 are available to provide the selected media content event, then the media content event retrieval logic 218 may manage the selection of which particular one of the content sources such as third party providers 114, programming providers 112 and/or the media broadcast facility 106 will be accessed. The selection of content sources may be based upon digital rights management, cost, availability and/or the like.

Some embodiments of the media device 102 may be configured to receive instructions from the replacement content device that cause the media device 102 to access and store the missed media content event. For example, but not limited to, the media device 102 may respond to a query or the like from the replacement content device 104. If the replacement content device 104 is able to rebroadcast the missed media content event using the media content broadcast facility 106, and/or if the replacement content device 104 determines that the missed media content event is available over a video on demand service on the media device 102 or over a communications network 110, then the replacement content device 104 may be configured to direct the media device 102 to store the content. Additionally, or alternatively, the media device 102 may also report back to the replacement content device 104 information that indicates successful storing of the missed media content event.

Figure 3:
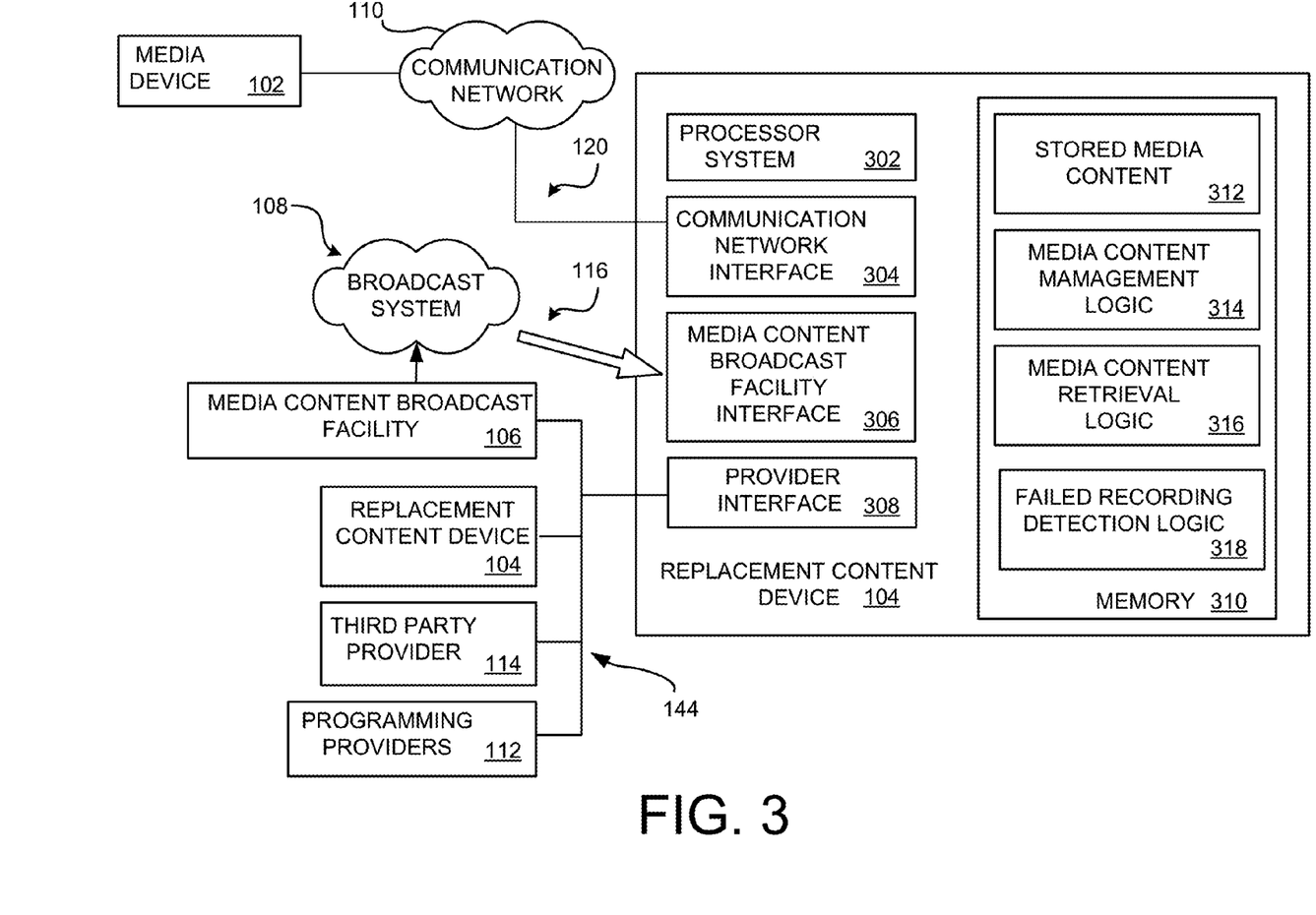
FIG. 3 is a block diagram of an embodiment of an exemplary media device.

FIG. 3 is a block diagram of an exemplary embodiment of the replacement content device 104. The exemplary replacement content device 104 includes at least a processor system 302, at least one communication network interface 304, a media content broadcast facility interface 306, a provider interface 308 and a memory 310. Memory 310 may include stored media content 312, media content management logic 314, media content retrieval logic 316, and failed recording detection logic 318. Other replacement content devices 104 may include some, or may omit some, of the above-described components. Further, additional components not described herein may be included in alternative embodiments of the replacement content device 104.

The media content broadcast facility interface 306 of the replacement content device 104 is communicatively coupled, via connection 144, to the media content broadcast facility 106, the third party providers 114 and the programming providers 112. Preferably, connection 144 is a high speed, high capacity connection so that relatively large amounts of media content can be transferred to the replacement content device 104 on a real time, or near real time, basis. Non-limiting examples of the connection 144 include coaxial cables, fiber optic cables, or other suitable high-capacity packet-based network connections, such as those available for lease through third-party vendors. In some embodiments, an antenna may be alternatively used to receive media content from the broadcast system 108.

The replacement content device 104 is illustrated as being remote from the media content broadcast facility 106. In other embodiments, the replacement content device 104 may reside within the media content broadcast facility 106. In such embodiments, all of, or portions of, the replacement content device 104 may be integrated with various components of the media content broadcast facility 106.

In embodiments of the replacement content device 104 that are configured to receive notifications from media devices 102 of a failed recording of selected media content events, the notifications are received by the communication network interface 304. The processor system 302, executing failed recording detection logic 318, determines the quantity of media devices 102 that failed to record a selected media content event. The subscription type, geographic location, time zone and/or the like of the media devices 102 that failed to record the selected media content may also be determined. The executed failed recording detection logic 318, based on a quantity of media devices 102 that failed to record the selected media content event, then selectively determines a method of replacing the selected media event content.

In one exemplary embodiment, when there are a large number media devices 102 that failed to store a selected media content event, then preferably the media content broadcast facility 106 is activated to rebroadcast the media content event. In one exemplary embodiment, a large number of media devices may be a thousand or more media devices.

In another example, if there are a reduced number of media devices 102 that failed to store a media content event, then the replacement content device 104 may attempt to use the communication network 110 to transmit the missed media content event directly to the media device 102. In some embodiments, the replacement content device 104 may present the media content event using a video on demand service. In yet another example, the replacement content device 104 may direct a media device 102 to a content source such as a third party provider 114 to access/retrieve the missed media event content. In some embodiments a reduced number of media devices 102 may be less than a thousand media devices that failed to store a media content event. In other embodiments, a reduced number of media devices 102 may be calculated based on bandwidth, service fees, account status and/or the like.

In some instances the executed failed recording detection logic 318, is unable to retrieve missed media content events due to digital rights management, copyright issues and/or the like. In such cases, the processor system 302, executing the media content management logic, accesses third party providers 114 and programming providers 112 through the provider interface 308 to retrieve and/or connect to a missed media content event. For example, a missed media event, such as a popular sitcom, was missed at a media device 102, the replacement content device 104 was unable to provide the missed media content event through the media content broadcast facility 106, and thus must find the media event content elsewhere. Using the provider interface 207, the media content event is found on a third party provider 114 for a fee. The replacement content device 104 communicates such information to the media device 102. The replacement device 104 may then act as a conduit for the connection to the third party provider 114.

In embodiments of the replacement content device 104 that are configured to receive broadcasted media content streams 116, the media content streams 116 are received by the media content broadcast facility interface 306. A plurality of tuners (not shown) in the media content broadcast facility interface 306 selectively tune to one of the media content streams 116 in accordance with instructions received from the processor system 302. The processor system 302, executing the media content management logic 314, parses out media content associated with a selected media content event of interest. The media content event of interest is then stored into the stored media content 312 memory medium.

Alternatively, or additionally, embodiments of the replacement content device 106 may be configured to receive a media content stream 116 directly from the media content broadcast facility 106 and/or directly from another media content source (not shown). The processor system 302, executing the media content management logic 314, stores the media content events into the stored media content 312 memory medium.

Embodiments of the communication network interface 304 are configured to communicatively couple the replacement content device 104 with the media devices 102, third party providers 114, programming providers 112 and/or the media content broadcast facility 106, via the communication link 120 established through the communication network 110. The communication network interface 304 is preferably configured to accommodate a plurality of communication links to a plurality of media devices 102 so that each media device 102 may receive a requested missed media content events. The communication network interface 304 may be any suitable communication device, component, or system operable to communicate over the communication network 110.

Embodiments of the media content broadcast facility interface 306 are configured to communicatively couple the replacement content device 104 with the media content broadcast facility interface 306, via the communication link 120. The media content broadcast facility interface 306 may be any suitable communication device, component, or system operable to communicate over the communication link 120 established with the media content broadcast facility 106.

In operation, an exemplary embodiment of the replacement content device 104 may be configured to store a plurality of media content events. The media content event management logic 314 manages storage of the selected media content events. In an exemplary embodiment, the media content event management logic 314 may employ a database management system to track and manage a plurality of stored media content events.

The media content retrieval logic 316 manages communication of the selected media content event to requesting media devices 102. The media content event retrieval logic 316 is executed to process each request to establish a communication link 120 with a requesting media device 102. If the request is valid, the communication link 120 is established. For example, an identifier, security code, or the like may be included in the initial request that indicates that the media device 102 is authorized to receive the requested media content event. Security features may be used to verify that the electronic device that is attempting to establish a communication link is a bonafide media device 102. Accordingly, access by unauthorized media devices 102, impostor electronic devices, or the like, may be denied.

Once the communication link 120 is established with the requesting media device 102, the media content event retrieval logic 316 processes the request to identify the selected media content event. If the requesting media device 102 is authorized to receive the selected media content event, then the media content retrieval logic 316 may retrieve the media event from the stored media contents 312 portion of the memory 310. Authorization of a particular media device 102 to receive the selected media content event may be based upon services subscribed by the requesting media device 102, such as premium channels, accounts with third party providers, and/or pay per view media content events. Alternatively, or additionally, authorization may be based on other factors, such as an account balance, and/or parental control settings in effect at the requesting media device 102.

The media content retrieval logic 316 may process the retrieved media content event into a format that is suitable for communication over the communication network 120. Further, the media content retrieval logic 316 may process the retrieved media content event into a format of the media content that is required by the requesting media device 102.

For example, the media device 102 may receive the media content event over the satellite broadcast system 124. However, the requesting media device 102 may be configured to receive the media content stream 116 over the cable system 140, and thus, may be configured to receive the media content event in a format that is different than the same media content event received by the media device 104.

Figures 4, 5:
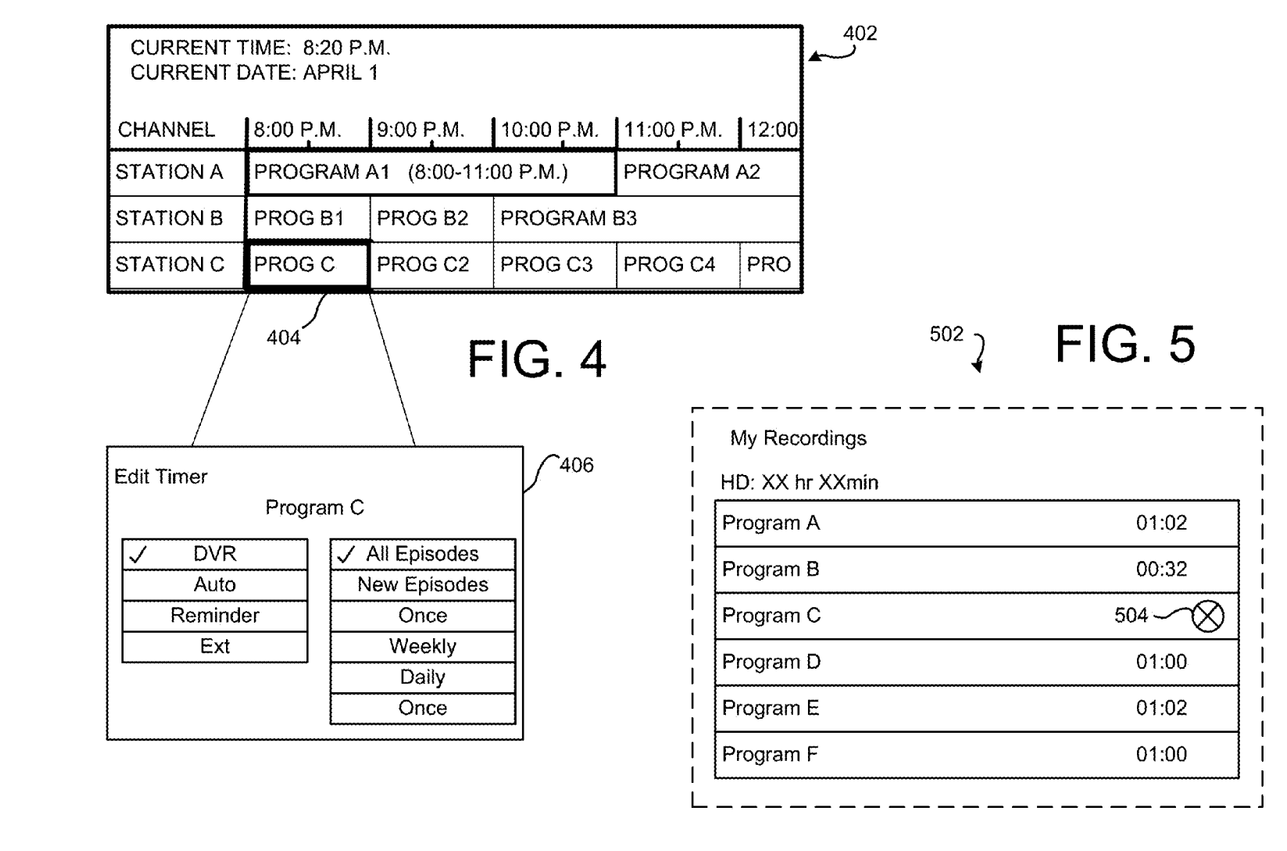
FIG. 4 is a block diagram of a hypothetical current electronic program guide generated by the media device and presented on a media presentation device.
FIG. 5 is a block diagram of a hypothetical digital video recorder interface generated by the media device and presented on a media presentation device.

FIG. 4 is a block diagram of an exemplary EPG 402 generated by an embodiment of the media device 102. The EPG 402 presents program information identifying a plurality of media content events currently available and available in the near future, for a plurality of programming channels. The programming channels are identified by a suitable identifier, such as the name of the programming station or the like. Here, the three channels are identified as stations A-C. The media device 102 is configured to present programming that is provided by many different programming channels, sometimes even several hundreds of different programming channels. Accordingly, the user is able to navigate about the EPG 402 so as to be able to view selectable media content events provided on a plurality of programming channels.

In the exemplary EPG 402, the current time is 8:20 p.m. on April 1. Programs that are available at the current time of 8:20 p.m. are identified on the EPG 402. In the exemplary EPG 402, programs currently available are shown adjacent to the programming channel on which they are available. For example, the exemplary media content event "program A1" is currently available on the programming channel identified as "Station A" (and so on).

The EPG 402 illustrates available media content events by presenting the first program entries on the EPG 402 based on a predefined time increment, such as an hour or a half hour. For example, since the current time is 8:20 p.m., the exemplary EPG 228 begins presentation of the program scheduling information at 8:00 p.m. Thus, the viewer is able to appreciate which media content events are currently available for viewing, and more particularly, which media content events that are available to be recorded.

The EPG 402 also provides information pertaining to media content events that will be available in the future. The future time period extends out to some predefined time, which is limited by the available display size for the EPG 402. In this simplified example, the time available for showing future program information extends out for four and one half hours, or out to 12:30 a.m.

In this simplified example, program C 404 is shown as selected by a user. When selected, an example dialog box 406 is displayed on top of, beside or instead of the EPG 402. The dialog box 406 displays various options for recording a media content event using a DVR 210. The dialog box enables a user to select the frequency of storing a media content event. In this example, the user has selected all episodes. However in other embodiments, the user may select all new episodes, recording of a series of media content events and/or the like. Once a repetitive storing or recording event is set, such as is shown in dialog box 406, then the media device 102 is configured to determine if a media event fails to record. If a media event is missed, then the media device 102 may notify the replacement content device as shown with reference to FIG. 1.

FIG. 5 is a block diagram of a hypothetical DVR interface 502 generated by the media device 102. The DVR interface 502 presents a list of successfully recorded media events with related recording lengths. The DVR interface 502 is configured to allow a user to navigate around the interface 502, and select a program for playback. In this exemplary embodiment, program C has an icon 504, noting that program C failed to record. In this embodiment, the media device 102, has automatically notified the replacement content device 104 to retrieve the missed media content. When selected, program C having icon 504 generates an interface showing a plurality of locations for the missed media content as shown with reference to FIG. 6.

Figure 6:
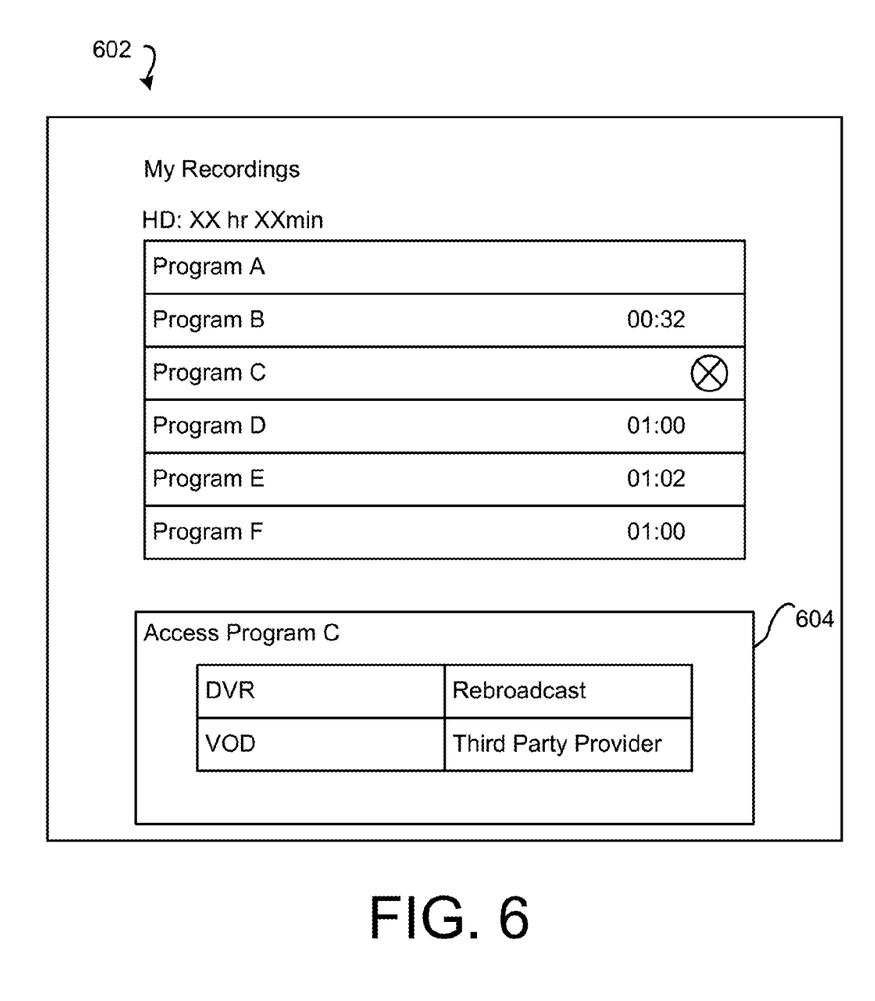
FIG. 6 is a block diagram of a hypothetical replacement content interface generated by the media device and presented on a media presentation device.

FIG. 6 is a block diagram of a hypothetical replacement content interface 602 generated by the media device 102. When the DVR displays an occurrence of missed media content in replacement content interface 602, a user may select an indication of the missed media content, thus activating media content access interface 604. The access interface 604 notifies a user of various locations and/or a status of the missed media content. For example, a replacement content device 104 may have notified the media device 102, that the missed content is available through a video on demand service or will be rebroadcast in the future. The missed media event may have already been stored on the media device 102 and is now available using the DVR 210. Finally the interface 604 may indicate a plurality of third party providers that have the media content for viewing or for sale. Such providers are accessible through the interface 604.

It should be emphasized that the above-described embodiments of the replacement content retrieval system 100 are merely possible examples of implementations of the invention. Many variations and modifications may be made to the above-described embodiments. All such modifications and variations are intended to be included herein within the scope of this disclosure and protected by the following claims.

The invention claimed is:

1. A method that provides access to media content to a second plurality of media devices, wherein the second plurality of media devices are members of a first plurality of media devices that initially receive a broadcast of the media content via a broadcast system, the method comprising:
   receiving, at a replacement content device, a plurality of first notifications from the second plurality of media devices, wherein the received plurality of first notifications each indicate that the corresponding one of the second plurality of media devices has failed to record at least a portion of a media content event that has been broadcast over the broadcast network to the first plurality of media devices;
   identifying, based on the received plurality of first notifications, the media content event having at least the portion of the media content event that has failed to be recorded by each of the second plurality of media devices;
   determining, at the replacement content device, at least one of:
      location information that identifies at least one media content source that has stored at least the portion of the media content event that has failed to be recorded; and
      rebroadcast information that identifies a scheduled rebroadcast of at least the portion of the media content event that has failed to be recorded, wherein at least the portion of the media content event that has failed to be recorded will be rebroadcast to the first plurality of media devices via the broadcast system; and
   communicating from the replacement content device a second notification to each of the second plurality of media devices, wherein the second notification indicates at least one of:
      the location information that identifies:
         the at least one media content source that has stored at least the portion of the media content event that has failed to be recorded; and
         communication link information that enables the second plurality of media devices to establish a communication link to the at least one media content source so that at least the portion of the media content event that has failed to be recorded can be accessed by the second plurality of media devices; and
      the rebroadcast information that identifies a future time of broadcast to the first plurality of media devices via the broadcast system of at least one of:
         a first time identifying a beginning of a rebroadcast the portion of the media content event that has failed to be recorded; and
         a second time identifying a beginning of a rebroadcast of the media content event.

2. The method of claim 1, further comprising:
   communicating a request to the at least one media content source, wherein the request includes information identifying the failed recording of at least the portion of the media content event, and wherein the request is to receive information that indicates the location information that may be used by the second plurality of media devices to access the media content event or at least the portion of the media content event that has failed to be recorded from the at least one media content source; and
   receiving the requested information from the at least one media content source that indicates the location information.

3. The method of claim 1, wherein the media content event associated with the portion of the media content event that has failed to be recorded is not currently scheduled to be rebroadcast at a time that the requests from the second plurality of media devices are received at the replacement content device, the method further comprising:
   determining a number that identifies the number of the second plurality of media devices;
   communicating a request, after the time that the requests from the second plurality of media devices have been received and when the determined number is at least equal to a predefined number, to at least one of a media content broadcast facility that broadcasts the plurality of media content events to the first plurality of media devices, a third party provider that provides the at least one of the broadcasting media content events, and a programming provider that provides the at least one of the broadcasting media content events,
      wherein the request includes information specifying the number that identifies the number of the second plurality of media devices, and
      wherein the request is to rebroadcast the media content event associated with the portion of the media content event that has failed to be recorded; and
   receiving new information from the entity operating the media content broadcast facility that indicates a new future time that the media content event associated with the portion of the media content event that has failed to be recorded is scheduled to be rebroadcast.

4. The method of claim 3, wherein when the determined number is less than the predefined number, the method further comprising:
accessing, at the replacement content device, at least the portion of the media content event that has failed to be recorded from at least one media content source; and
communicating, from the replacement content device to at least one of the second plurality of media devices, at least the portion of the media content event that has failed to be recorded.

5. The method of claim 1, wherein the media content event associated with at least the portion that failed recording is rebroadcast at the indicated future time, and wherein at least one of the second plurality of media devices record only the portion of the media content event that has failed to be recorded or record all of the rebroadcast media content event.

6. The method of claim 1, wherein determining, at the replacement content device, the location information that identifies at least one media content source that has stored at least the portion of the media content event that has failed to be recorded further comprises:
determining, at the replacement content device, location information that identifies a plurality of media content sources that have each stored at least the portion of the media content event that has failed to be recorded,
wherein the second notification that is communicated to each of the second plurality of media devices includes the location information that identifies each of the plurality of media content sources that have each stored at least the portion of the media content event that has failed to be recorded, and includes communication link information that enables the second plurality of media devices to selectively establish a communication link to each one of the plurality of media content sources so that at least the portion of the media content event that has failed to be recorded can be accessed by the second plurality of media devices from the selected one of the plurality of media content sources.

7. The method of claim 1, wherein the replacement content device is a first one of a plurality of replacement content devices, wherein the first replacement content device is associated with a specific geographic location that is in a vicinity of the second plurality of media devices, and wherein the rebroadcast information communicated to the second plurality of media devices identifies the future time of broadcast of the media content event that has failed to be recorded will be rebroadcast to at least the first plurality of media devices via the broadcast system that broadcasts to at least the specific geographic location associated with the first replacement content device.

8. The method of claim 1, wherein the second notification that includes the rebroadcast information further includes recording instructions that cause at least one of the second plurality of media devices to record the media content event as the media content event is being rebroadcast.

9. The method of claim 1:
wherein the second notification that includes the location information that identifies at least one media content source that has stored at least the portion of the media content event that has failed to be recorded further includes information indicating that a fee that will be charged to at least one of the second plurality of media devices if that at least one of the second plurality of media devices accesses at least the portion of the media content event that has failed to be recorded from the at least one media content source, and wherein the at least one of the second plurality of media devices only accesses at least the portion of the media content event that has failed to be recorded from the identified at least one media content source only after payment of the fee by the at least one of the second plurality of media devices.

10. The method of claim 1, further comprising:
determining for each one of the second plurality of media devices, at the replacement content device, whether each one of the second plurality of media devices is authorized to receive at least the portion of the media content event that has failed to be recorded that is available from the at least one media content source,
wherein the location information is communicated from the replacement content device only to those second plurality of media devices that are authorized to receive at least the portion of the media content event that has failed to be recorded from the at least one media content source.

11. A replacement content device that is operable to communicatively couple to a first plurality of media devices that initially receive a broadcast of a plurality of media content events via a broadcast system, comprising:
a communication network interface that communicatively couples the replacement content device to a communication network,
wherein the first plurality of media devices are able to establish a communication link to the replacement content device via the communication network when a recording of at least a portion of a broadcasting media content event by the corresponding one of the second plurality of media devices has failed,
wherein the communication network interface is configured to receive a plurality of first notifications communicated from the second plurality of media devices via the communication network, and
wherein the received plurality of first notifications each indicate that the corresponding one of the second plurality of media devices has failed to record at least a portion of a media content event that has been broadcast over the broadcast network to the first plurality of media devices; and
a processor system that is communicatively coupled to the communication interface, wherein the processor system is configured to:
determine information, based on the received plurality of first notifications, that identifies the media content event having at least the portion that has failed to be recorded by each of the second plurality of media devices;
determine at least one of:
location information that identifies at least one media content source that has stored at least the portion of the media content event that has failed to be recorded; and
rebroadcast information that identifies a scheduled rebroadcast of at least the portion of the media content event that has failed to be recorded, wherein at least the portion of the media content event that has failed to be recorded will be rebroadcast to the first plurality of media devices via the broadcast system; and
generate a second notification that indicates at least one of:
the location information that identifies at least one media content source that has stored at least the portion of the media content event that has failed to be recorded, and communication link information that enables the second plurality of media devices to establish the communication link to the at least one media content source so that at least the portion of the media content event that has failed to be recorded can be accessed by the second plurality of media devices; and the rebroadcast information that identifies a future time of broadcast of the media content event that has failed to be recorded will be rebroadcast to the first plurality of media devices via the broadcast system, wherein the generated second notification is communicated from the replacement content device, via the communication network interface, to the second plurality of media devices.

12. The replacement content device of claim 11, further comprising:

a provider interface communicatively coupled to the processor system, wherein the provider interface communicatively couples the replacement content device to the at least one media content source, wherein the processor system is further configured to generate a request that is communicated via the provider interface to the at least one media content source, wherein the request includes the information that identifies the media content event having at least the portion that has failed to be recorded, and wherein the request is to receive information that indicates the location information that may be used by the second plurality of media devices to access the media content event or to access at least the portion of the media content event that has failed to be recorded from the at least one media content source.

13. The replacement content device of claim 12, wherein the request that is communicated via the provider interface to the at least one media content source further includes a request to have at least the portion of the media content event that has failed to be recorded to be communicated to the replacement content device, wherein the replacement content device communicates the at least the portion of the media content event that has failed to be recorded to at least one of the second plurality of media devices.

14. The replacement content device of claim 11, wherein the at least one media content source is one of:

a media content broadcast facility that broadcasts the plurality of media content events to the first plurality of media devices;

a replacement content device that has stored at least one of the broadcasting media content events;

a third party provider that provides the at least one of the broadcasting media content events; and a programming provider that provides the at least one of the broadcasting media content events.

15. The replacement content device of claim 11, wherein the plurality of media content events that are broadcast to the first plurality of media devices via the broadcast system are a first plurality of media content events, the replacement content device further comprising:

a media content broadcast facility interface having a plurality of tuners, wherein each one of the tuners receives one of a second plurality of media content events selected from the first plurality of broadcasting media content events; and a memory communicatively coupled to the processor system and the tuners of the media content broadcast facility interface, wherein the memory stores each of the received second plurality of media content events, wherein the processor system is further configured to:

determine whether the media content event having the portion that has failed to be recorded is one of the stored second plurality of media content events;

access at least the portion of the media content event that has failed to be recorded from the memory when the media content event is one of the stored second plurality of media content events; and communicate at least the portion of the media content event that has failed to be recorded that has been accessed from the memory to the second plurality of media devices.

16. The replacement content device of claim 15, wherein the processor system is further configured to:

determine for each one of the second plurality of media devices, at the replacement content device, whether each one of the second plurality of media devices is authorized to receive at least the portion of the media content event that has failed to be recorded that is available from the at least one media content source, wherein at least the portion of the media content event that has failed to be recorded is communicated from the replacement content device only to those second plurality of media devices that are authorized to receive at least the portion of the media content event that has failed to be recorded from the at least one media content source.

17. The replacement content device of claim 11, wherein the processor system is further configured to:

determine for each one of the second plurality of media devices, at the replacement content device, whether each one of the second plurality of media devices is authorized to receive at least the portion of the media content event that has failed to be recorded that is available from the at least one media content source, wherein location information is communicated from the replacement content device only to those second plurality of media devices that are authorized to receive at least the portion of the media content event that has failed to be recorded from the at least one media content source.

18. A method that provides access to media content to a second plurality of media devices, wherein the second plurality of media devices are members of a first plurality of media devices that initially receive a broadcast of the media content via a broadcast system, the method comprising:

receiving, at a replacement content device, a plurality of media content events that are being broadcast to the first plurality of media devices;

storing, in a memory of the replacement content device, the broadcasting plurality of media content events;

receiving, at the replacement content device, a plurality of first notifications from the second plurality of media devices, wherein the received plurality of first notifications each indicate that the corresponding one of the first plurality of media devices has bailed to record at least a portion of a media content event that has been broadcast over the broadcast network to the first plurality of media devices, and wherein the media content event having the portion that has failed to be recorded is one of the plurality of media content events that have been received and stored at the replacement content device; and communicating from the replacement content device a second notification to each of the second plurality of media devices, wherein the second notification indicates that at least the portion of the media content event that has failed to be recorded may be received from the replacement content device.

19. The method of claim 18, further comprising:
receiving, at the replacement content device after the second notification is communicated from the replacement content device, a request from at least one of the second plurality of media devices to receive at least the portion of the media content event that has failed to be recorded;
retrieving at least the portion of the media content event that has failed to be recorded from the memory of the replacement content device; and
communicating, from the replacement content device and in response to receiving the request, at least the retrieved the portion of the media content event that has failed to be recorded from the replacement content device to at least one of the requesting second plurality of media devices.

20. The method of claim 19, wherein communicating at least the retrieved the portion of the media content event that has failed to be recorded from the replacement content device to at least the requesting one of the second plurality of media devices further comprises:
retrieving the media content event that has the portion that has failed to be recorded from the memory of the replacement content device; and
communicating all of the media content event from the replacement content device to at least the requesting one of the second plurality of media devices in response to receiving the second request.

* * * * *

UNITED STATES PATENT AND TRADEMARK OFFICE
CERTIFICATE OF CORRECTION

Page 1 of 1

PATENT NO. : 10,033,960 B2
APPLICATION NO. : 15/606655
DATED : July 24, 2018
INVENTOR(S) : Mi Chen It is certified that error appears in the above-identified patent and that said Letters Patent is hereby corrected as shown below:

In the Claims

Claim 18, Column 18, Line 58, please correct as follows:
bailed should be changed to -- failed --

Signed and Sealed this
Ninth Day of July, 2019

Andrei Iancu
*Director of the United States Patent and Trademark Office*